J. F. CASS.
Wagon-Racks.
No. 165,789. Patented July 20, 1875.
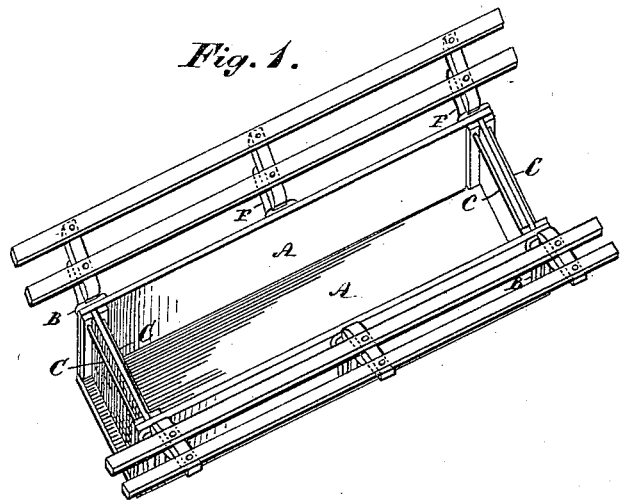
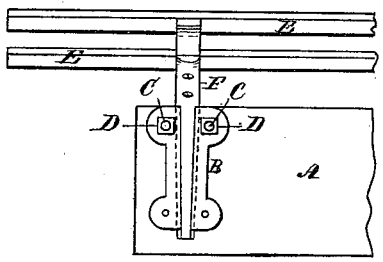 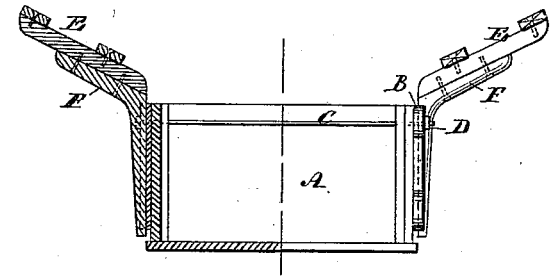
Witnesses:
John Grist, Junr
J. S. Grist
J F Cass
Inventor.
Per Henry Grist
Attorney.

UNITED STATES PATENT OFFICE.

JAMES F. CASS, OF L'ORIGINAL, ASSIGNOR OF TWO-THIRDS HIS RIGHT TO JAMES McCALLUM AND ALPHEUS McCALLUM, OF KARS, CANADA.

IMPROVEMENT IN WAGON-RACKS.

Specification forming part of Letters Patent No. 165,789, dated July 20, 1875; application filed June 26, 1875.

*To all whom it may concern:*

Be it known that I, JAMES FORTUNE CASS, of L'Original, in the county of Prescott, in the Province of Ontario, in the Dominion of Canada, have invented certain new and useful Improvements in Wagon-Racks; and I do hereby declare that the following is a full, clear, and exact description of the same.

In this invention sockets are fastened to the outsides of the box by rods passing transversely therethrough and secured by nuts. The sockets receive brackets, to which are attached the racks.

Figure 1 is a perspective view of a wagon-box and rack embodying my invention. Fig. 2 is a side elevation of a part of the same. Fig. 3 is an end view, part in elevation, part in section.

A is the ordinary box of a wagon. B are sockets fastened to the outside by rods C, passing transversely through the sockets and box, and secured by nuts D, screwing on the end of the rods. The rods C, by passing transversely through the box, prevent the longitudinal sides from spreading, and for the better securing of the sockets thereto they pass on the inside and outside of the head and tail boards, respectively, to resist the strain on the rods when the nuts are screwed home. Fixed to the rack E are brackets F, to slip into the sockets, which preferably have a dovetailed tapering groove to receive a corresponding shaped fang of the brackets, to prevent rattling at the joint. The rack is attached to the box by inserting the brackets in the sockets, and is removable therefrom by simply lifting it upwardly.

I claim as my invention—

1. The dovetailed sockets B and brackets F, in combination with a wagon-body, A, as and for the purpose set forth.

2. The sockets B, fastened to the wagon-box by rods C passing transversely therethrough, and secured by nuts D, as set forth.

J. F. CASS.

Witnesses:
SAMUEL J. KELLY,
JOHN BUTTERFIELD.